March 13, 1934. A. E. KROGH 1,950,614
CONTROL APPARATUS
Filed July 14, 1932 2 Sheets-Sheet 2
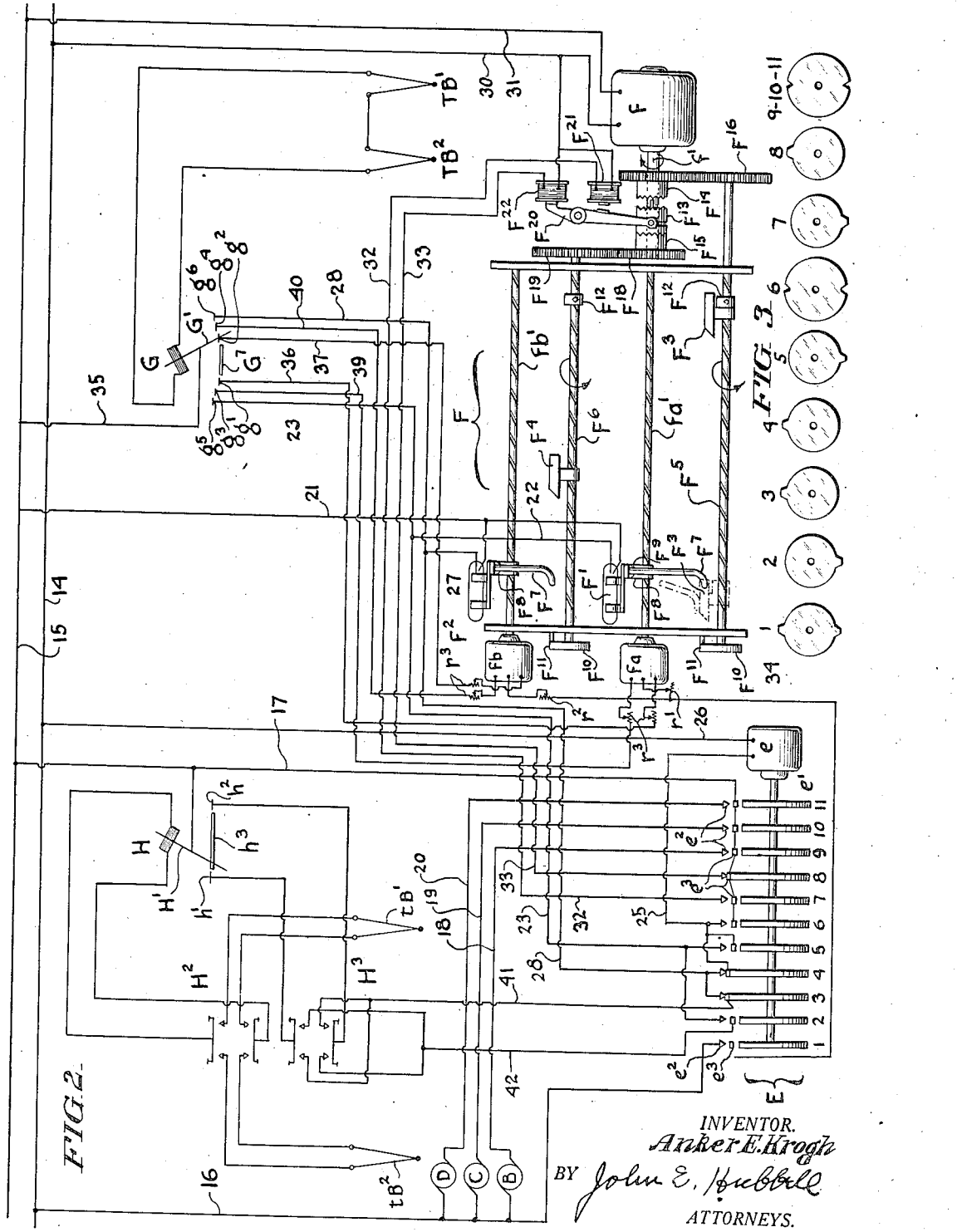
INVENTOR.
Anker E. Krogh
BY John E. Hubbell
ATTORNEYS.

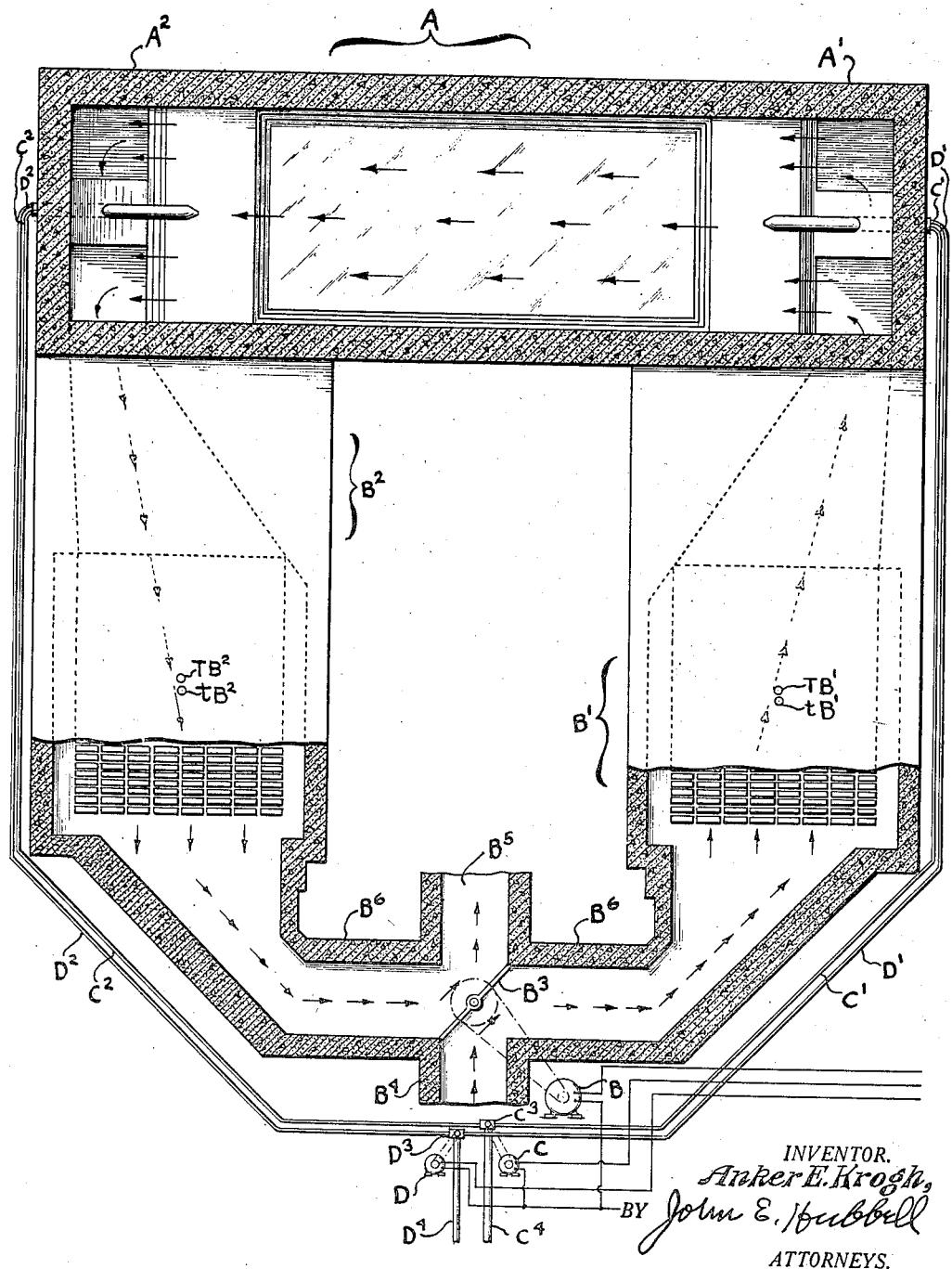

Patented Mar. 13, 1934

1,950,614

UNITED STATES PATENT OFFICE 1,950,614

CONTROL APPARATUS

Anker Eiler Krogh, Philadelphia, Pa., assignor to The Brown Instrument Company, Philadelphia, Pa., a corporation of Pennsylvania Application July 14, 1932, Serial No. 622,418

24 Claims. (Cl. 236—15)

The general object of the present invention is to provide improved control apparatus for effecting control operations at intervals and is particularly characterized by the provisions which it includes for regulating the intervals between successive control operations. In its preferred form, the invention comprises a timing mechanism operative to automatically effect control operations at predetermined time intervals, and having provisions for the adjustment of those intervals both manually and automatically in response to certain conditions of operation of the controlled apparatus. An advantageous characteristic of the invention in respect to the features just referred to arises from its capacity to effect control operations at suitable regular intervals in case of failure of the above mentioned automatic adjusting provisions.

The invention in its preferred form is characterized, also, by its provisions for effecting corrective control operations independently of the timing mechanism in response to certain emergency conditions which may arise in the operation of the controlled apparatus.

While the invention in its broader aspects is not restricted to such use, it was primarily devised for, and is of especial utility in controlling the reversing mechanism of a regenerative furnace. For such use the timing mechanism of my control apparatus may be manually adjusted to effect reversals so that each period of gas flow through the regenerators and furnace proper in one direction may be equal or unequal, as conditions may make desirable, to each period of flow through the regenerators and furnace in the opposite direction. In controlling regenerative furnaces in accordance with the present invention, the automatic adjusting provisions of the timing mechanism are advantageously made subject to the control of means responsive to the differential of temperature in the two regenerators. In practice the last mentioned means may comprise two thermo-couples, one responsive to the temperature in one, and other to the temperature in the second of the two cooperating regenerators, which are connected in bucking relation to a suitable potentiometer, millivolt or other control meter.

For use in controlling the reversals in a regenerative furnace in the general manner above described my control apparatus preferably includes provisions, whereby on the attainment of an excessive differential regenerator temperature in either direction, the differential temperature responsive means will effect emergency reversals independently of the timing mechanism and its condition. Preferably also such control apparatus includes provisions for effecting emergency reversals independent of the timing mechanism in response to excessive temperatures in the individual regenerators.

In addition to novel features of combination and arrangement whereby my control apparatus is enabled to produce the general operative results hereinbefore mentioned, the invention embodies novel control apparatus sub-combinations and features.

The various features of novelty which characterize my invention are pointed out with particularity in the claims annexed to and forming a part of this specification. For a better understanding of the invention, however, the advantages possessed by it, and specific objects attained with it, reference should be had to the accompanying drawings and descriptive matter in which I have illustrated and described a preferred embodiment of the invention.

Of the drawings:

Fig. 1 is a diagrammatic plan view of an open hearth regenerative furnace of conventional type;

Fig. 2 is a diagram of a preferred form of control apparatus suitable for controlling the reversal of the furnace shown in Fig. 1; and Fig. 3 is a diagrammatic representation illustrating the contours, and relative times of action of switch cams of an automatic switch mechanism included in the apparatus shown in Fig. 2.

In the drawings, I have illustrated the use of the present invention in controlling the operation of a regenerative open hearth furnace A heated by the combustion of fuel oil. With the heating gases flowing through the furnace from its end A' toward its end $A^2$, as shown in Fig. 1, the furnace receives, at its end A', preheated air for combustion from a regenerator B', fuel oil through a branch pipe C', and atomizing steam through a branch pipe D'. With the reverse direction of heating gas flow, the furnace receives at its end $A^2$, preheated air for combustion from a regenerator $B^2$, fuel oil through a branch pipe $C^2$, and atomizing steam through a branch pipe $D^3$.

The direction of air and gas flow through the regenerators B' and $B^2$ depends upon the position of a reversing valve or damper $B^3$ adjusted by an intermittently operating relay motor B. At each operation of the motor B, the damper $B^3$ is adjusted to disconnect the conduit $B^6$ leading to the inlet end of the previously "on" regenerator from the air inlet B⁴, and to connect that conduit to the stack flue B⁵, and to disconnect the conduit B⁶ running to the cool end of the previously "off" regenerator from the stack connection B⁵ and connect that conduit to the air inlet B⁴. As shown in Fig. 1, the damper B³ is in the position in which the regenerator B' is the "on" regenerator and supplies preheated air for combustion to the end A' of the furnace A, while the regenerator B² is serving as an "off" regenerator and is being heated by the gases passing to the stack from the furnace end A'.

As diagrammatically and conventionally illustrated in Fig. 1, the connection of the fuel oil branch pipes C' and C² to a fuel supply pipe C⁴ is regulated by a valve C³, the latter being adjusted by an intermittently operating relay motor C. The latter adjusts the valve C³ to interrupt the flow of fuel oil to the furnace through the branch pipes C' or C², previously supplying fuel to the furnace at or shortly before the time when the damper B³ is adjusted to interrupt the supply of preheated air to the furnace through the regenerator B' or B², respectively, and initiates the flow of oil through the other branch pipe C² or C', respectively, at or shortly after the completion of the last mentioned adjustment of the damper B³. Preferably, during a period beginning a little before and ending a little after each period of adjustment of the damper B³, the valve C³ is in position to prevent the flow of oil to the furnace through either of the branch pipes C' and C².

The flow of steam through the branch pipes D' and D² from the steam supply pipe D⁴ is regulated by a valve D³ adjusted by an intermittently operating relay motor D. The latter may be similar to the motor C, and may adjust the valve D³ to supply steam to the furnace through the pipes D' and D² during the respective periods in which the furnace is supplied with fuel oil through the pipes C' and D'.

In Fig. 2, I have diagrammatically illustrated a control system constituting a preferred embodiment of my invention in a form suitable for use in controlling the relay motors B, C and D, shown in Fig. 1. In Fig. 2, the energization of the motors B, C and D for each reversal operation is directly effected by the closure of the cam switches 9, 10 and 11, respectively, of a motor switch mechanism or sequence operator E. The latter comprises other cam switches 1 to 8, employed, as hereinafter described, in regulating the starting into operation of the intermittently operating motor e, which forms the driving motor of mechanism E, and at each operation gives a half turn to the cam shaft e', and thereby adjusts each of the cam switches 1 to 11. Under normal operating conditions, the setting into operation of the motor e is directly controlled by a timing mechanism F, which includes a constantly running driving motor f. The mechanism F includes means effective to start the motor e into operation at predetermined time intervals, which may be adjusted manually, and also automatically in accordance with furnace temperature conditions.

The provisions included in the mechanism F for the automatic regulation of said time intervals comprise intermittently operating reversible relay motors fa and fb, the energization of each of which for operation in either direction, is controlled by a meter G. The latter may be a millivolt meter, a potentiometer or other known or suitable type of control meter, and is shown in Fig. 2 as a simple control galvanometer having its winding connected in series with thermocouples TB' and TB². The latter are adapted to respond to the temperatures in the regenerators B' and B², respectively, and are connected in bucking relation, so that the meter pointer G' will deflect in one direction, counter-clockwise as shown, or in the opposite direction, accordingly as the temperature of the regenerator B' falls or rises relative to the temperature of the regenerator B². When, at any reversal period following an interval of flow in one direction, the regenerator temperature differential is relatively low, so that the meter pointer G' then engages one or the other of meter low contacts g' or g², an energizing circuit is completed for the motor fa or fb, respectively, and the motor energized adjusts the timing mechanism F to increase the subsequent period of flow in the same direction. Conversely, when at any reversal period the differential temperature is sufficiently high to bring the meter pointer G' into engagement with the high meter contacts g³ and g⁴, an energizing circuit for the corresponding motor fa or fb is completed and the motor so energized adjusts the timing mechanism F to shorten the following period of flow in the same direction.

Whenever the differential temperature becomes abnormally high, so that the pointer G' engages emergency meter contacts g⁵ or g⁶, an emergency energizing circuit for the motor e is closed, so that reversal is immediately effected, independently of and without regard to the condition of the timing mechanism F.

To guard against unduly high and unduly low regenerative temperatures, the system shown in Fig. 2 includes a control meter H, measuring the temperatures in regenerators B' and B², and provisions through which the meter H directly energizes the motor e independently of the timing mechanism F to thereby effect a furnace reversal, whenever either the temperature in the then off regenerator becomes low enough to cause the meter pointer H' to engage the meter control contact h', or the temperature in the then on regenerator becomes high enough to cause the pointer H' to engage the control contact h². The meter H may be a milli-volt meter, a potentiometer or other known or suitable instrument, and in practice will ordinarily be meter for measuring and recording the individual temperatures in the regenerators B' and B² in regular alternation at suitably frequent intervals.

As diagrammatically shown, the meter H is a simple control galvanometer of well known type diagrammatically illustrated, for example, in my prior Patent No. 1,827,528, granted October 13, 1931, comprising control contacts periodically actuated if the deflection of the meter pointer permits, and periodically actuated switch means for shifting circuit connections first in one way and then in another at regular intervals. The switch means of the meter H comprises a switch H² which serves to connect the terminals of the winding of the meter at regular intervals to the terminals of the theromocouple tB', and at alternate intervals to the terminals of the thermo-couple tB². The thermo-couples tB' and tB² are respectively responsive to the temperatures at suitable points in the individual regenerators B' and B². The meter H also includes a second switch $H^3$ which operates when the meter winding is connected to the thermo-couple $tB'$ by the switch $H^2$, to connect the meter contacts $h'$ and $h^2$ to control conductors 42 and 41, respectively, and when the switch $H^2$ connects the meter winding to the thermo-couple $tB^2$, the contacts $h'$ and $h^2$ are connected by the switch $H^3$ to the control conductors 41 and 42, respectively. The purpose of thus interchanging the connections between the contacts $h'$ and $h^2$ with the conductors 41 and 42 is hereinafter explained in detail. The above described circuit shifting action of the switches $H^2$ and $H^3$, as diagrammatically illustrated, requires that during alternate periods of operation all of the righthand contacts of the two switches be closed and all of the lefthand contacts be open, and that during the intervening periods of operation all of the lefthand contacts of the switches $H^2$ and $H^3$ be closed, and all of the righhand contacts of those switches be open.

As diagrammatically illustrated in Fig. 3, each of the cam switches 1 to 11 inclusive, includes a corresponding cam carried by a shaft $e'$ which is driven by the motor $e$ and includes a stationary switch contact $e^2$ and a cooperating movable switch contact $e^3$ separating from the contact $e^2$ when permitted to do so but moved into engagement therewith by the cam when the latter turns into its switch closing position. The contours of the different cams are shown in Fig. 3 in proper relative relation as the use of the symbol "9—10—11" in Fig. 3 indicates the cams 9, 10 and 11 are all in contour and disposition relative to the shaft $e'$. The cam switches 9, 10 and 11 directly control the energization of the relay motors B, C and D, respectively, and set them into operation once for each successive half revolution of the cam shaft $e'$ by connecting the motors to supply conductors 14 and 15. As shown, each of the motors B, C and D has one terminal directly connected by a branch conductor 16 to the supply conductor 14. The other supply conductor 15 has a branch conductor 17 connected to the movable contacts of the three switches 9, 10 and 11. The stationary contact of the switch 9 is connected by conductor 18 to the second terminal of the motor B, and the second terminals of the motors C and D are connected to the stationary contacts of the cam switches 10 and 11 by conductors 19 and 20, respectively. In practice, the motors B, C and D, and also the motor $e$, will ordinarily be provided with limit switches automatically interrupting their operation after movements of respectively predetermined extents sufficient for each of the motors B, C and D to effect its reversal operation, and sufficient for the motor $e$ to give a half revolution to the shaft $e'$, but, as such limit switches are well known and are customarily used in connection with such motors, no necessity exists for illustrating or describing them herein.

The energization of the motor $e$, whereby the latter is started into operation, is directly controlled in normal operation by the closure of a normally open switch $F'$ for every alternate half turn of the shaft $e'$, and for the other half turn movements of the shaft $e'$ by the closure of a normally open switch $F^2$, the switches $F'$ and $F^2$ forming a part of the timing mechanism F. When the switch $F'$ is in its closed condition, it connects a branch conductor 21 from the supply conductor 15 through conductors 22 and 23 to the stationary contact of cam switch 5. The movable contact of that switch is connected by a conductor 25 to one terminal of the motor $e$. The second terminal of the motor $e$ is connected by a branch conductor 26 to the supply conductor 14. When the switch $F^2$ is closed, it connects the branch conductor 21 from the supply conductor 15 through conductors 27 and 28 to the stationary contact of the cam switch 4. The movable contact of the last mentioned cam switch is also connected to the previously mentioned conductor 25, and hence to the corresponding terminal of the motor $e$.

The means through which the timing mechanism tends to and may close the switches $F'$ and $F^2$ at regular predetermined intervals comprises movable switch actuators $F^3$ and $F^4$. As shown, the switch actuator $F^3$ is in threaded engagement with a shaft $F^5$ formed with a coarse screw thread or helical groove, so that the switch actuator $F^3$ is moved longitudinally of the shaft $F^5$ to the right or to the left accordingly as the shaft is rotated in the direction indicated by the arrow in Fig. 2 or in the reverse direction. Similarly the switch actuator $F^4$ is in threaded engagement with, and is moved by the rotation of a shaft $F^3$ which is similar to the shaft $F^5$. When the shaft $F^5$ is rotated to move the switch actuator $F^3$ far enough to the left as seen in Fig. 2, it engages the actuating arm $F^7$ of the switch $F'$ and tilts the latter about its pivotal connection $F^9$ to its support $F^8$ into the dotted line position shown in Fig. 2. The switch $F'$ is shown as a mercury switch, which normally is in its open position shown in full lines, but is closed when tilted into the dotted line position shown in Fig. 2. The switch $F^2$ is similar to the switch $F'$, and is tilted about its support $F^3$ when the actuator $F^4$ is given sufficient movement to the left to engage and tilt the arm $F^7$ of the switch $F^2$.

The shafts $F^5$ and $F^6$ are intermittently rotated at alternate periods, to give their respective switch actuators $F^3$ and $F^4$ their movements to the left by alternately gearing the shafts to the shaft $f'$ of the constantly running motor $f$, which is energized through the branch conductors 30 and 31 from the supply conductors 14 and 15.

When either of the shafts $F^5$ or $F^6$ is gear connected to the motor shaft $f$, the other shaft $F^6$ or $F^5$ is disconnected from the shaft $f'$ and is then given a return rotation to move the corresponding switch actuator back to its initial righthand position. The return rotation of each shaft $F^5$ and $F^6$ is effected, as shown in Fig. 2, by a corresponding return spring $F^{10}$ having one end $F^{11}$ fixed, and the other end secured to the shaft $F^5$ or $F^6$, so that the spring will be wound up and put under tension sufficient to effect the return movement of the shaft by the motion given the latter by the motor shaft $f'$ when gear connected thereto. The initial righthand position of each switch actuator is determined by a corresponding collar $F^{12}$, adjustably secured on the corresponding shafts $F^5$ or $F^6$. By the adjustment of the position of either collar along the corresponding shaft $F^5$ or $F^6$, the righthand position of the corresponding switch actuator $F^3$ or $F^4$ may be adjusted. This permits of a manual adjustment of the time required for the movement of either switch actuator from its righthand position into its switch closing position for any particular adjustment of the corresponding switch $F'$ or $F^2$, and therefore permits of manual adjustment of the time intervals between reversals.

The means for alternately connecting the shafts $F^5$ and $F^6$ to the shaft $f'$ of motor $f$ includes a clutch member $F^{13}$ splined on the shaft $f'$ and movable longitudinally thereof between one position in which it interlocks with a clutch member $F^{14}$, and a second position in which it interlocks with a clutch member $F^{15}$. The clutch member $F^{14}$ is journalled on the shaft $f'$ and carries a spur gear in mesh with a spur gear $F^{16}$ carried by the shaft $F^5$. The clutch member $F^{15}$ is journalled on the shaft $f'$ and carries a spur gear $F^{18}$ in mesh with a spur gear $F^{19}$ secured to the shaft $F^6$. At each operation of the switch mechanism E, the clutch member $F^{13}$ is shifted from interlocking engagement with one, into interlocking engagement with the other of the two clutch members $F^{14}$ and $F^{15}$.

As shown the means for thus adjusting the clutch member $F^{13}$ comprise a pivoted armature lever $F^{20}$ tilted in one direction or the other accordingly as one or the other of two magnet coils $F^{21}$ and $F^{22}$ is energized. Each of the coils $F^{21}$ and $F^{22}$ has one terminal connected to the supply conductor 14 through the branch conductor 30. The second terminal of the coil $F^{21}$ is connected by a conductor 32 to the stationary contact of the cam switch 7. The movable contact of the latter is connected to the previously mentioned branch conductor 17 from the supply conductor 15. Through the described connections the closure of cam switch 7 energizes the coil $F^{21}$, and thereby disconnects the shaft $F^6$ from, and connects the shaft $F^5$ to the motor $f$. When the motor $e$ is next operated, the cam switch 8 closes a circuit which energizes the coil $F^{22}$ and thereby shifts the clutch member $F^{13}$ out of engagement with the clutch member $F^{14}$ and into engagement with the clutch member $F^{15}$. The energizing circuit for the coil $F^{22}$ so established includes the conductor 30, the coil $F^{22}$, the conductor 33 running to the stationary contact of the cam switch 8 and the conductor 17 connecting the movable contact of that switch to the supply conductor 15.

With the construction illustrated, the motor $fa$ adjusts the timing mechanism F to automatically vary the time intervals between reversals by virtue of the mounting of the support $F^8$ for the switch $F'$ in threaded engagement with a shaft $fa'$ which is alongside the shaft $F^5$ and is rotated by the motor $fa$. The rotation of the shaft $fa'$, whether effected manually or automatically by the energization of the motor $fa$, adjusts the position of the switch $F'$ in a direction parallel to the shaft $F^5$, and hence fixes the extent of, and time required for the movement of the switch actuator $F^3$ from its extreme righthand position into the position in which it engages the actuating arm $F^7$ of the switch $F'$ and closes the latter. Similarly the support $F^8$ of the switch $F^2$ is in threaded engagement with a shaft $fb'$ alongside the shaft $F^6$ and adapted to be rotated by the motor $fb$.

The energization of the motors $fa$ and $fb$ is controlled by the meter G in accordance with the differential of the regenerator temperatures to which the thermocouples $TB'$ and $TB^2$ respond as has been previously explained. The meter G effects its control over the energization of the motors $fa$ and $fb$ as a result of the movement of the pointer $G'$ of the meter into a position of engagement with one or another of control contacts $g'$—$g^4$. The meter G also has two emergency contacts $g^5$ and $g^6$. The contacts $g'$, $g^3$ and $g^5$ are at one side of, and at successively greater distances from the natural zero, or neutral position of the meter pointer, and the contacts $g^2$, $g^4$ and $g^6$ are at the opposite side of and at progressively greater distances from said neutral position of the pointer. In practice the various contacts $g'$—$g^6$ may be adjusted toward and away from said neutral position of the meter pointer.

Each of the reversible motors $fa$ and $fb$ has three terminals, one terminal of each motor being energized for motor operation in either direction, while one or other of the two remaining terminals is energized accordingly as the motor is to be operated in one direction or the other. The one terminal of each motor energized for motor operation in either direction, is connected through a conductor 34 to the movable contact of the cam switch 1, the stationary contact of switch 1 being connected to the supply conductor 14 through the previously mentioned conductor 16. With the switch 1 closed and the common terminal of motors $fa$ and $fb$ connected to the supply conductor 14, one of the other terminals of one or the other of the motors $fa$ and $fb$ will then be connected to the supply conductor 15, if the meter pointer $G'$ is in engagement with one or another of the meter contacts $g'$, $g^2$, $g^3$ or $g^4$, which motor will then be operated and the direction of its operation will depend on which of the contacts $g'$, $g^2$, $g^3$ and $g^4$ is engaged by the pointer $G'$. If, for example, the low contact $g'$ is so engaged, the motor $fa$ will be energized for operation in the direction to adjust the switch $F'$ to the left to correspondingly prolong the reversal periods terminated by the closure of switch $F'$.

The energizing circuit for the motor $fa$, completed to effect the operation just referred to, includes the conductor 35 which connects the supply conductor 15 to the meter pointer $G'$, and the conductor 36 which connects the meter contact $g'$ to one terminal of the motor $fa$. If, when the switch 1 is closed, the meter pointer $G'$ is in engagement with the low meter contact $g^2$, the motor $fb$ will be energized for operation in the direction to adjust the switch $F^2$ to the left, and thereby prolong the reversal periods terminated by the closure of switch $F^2$. The energizing circuit for so operating the motor $fb$ includes the conductor 35, and the conductor 37 which connects the contact $g^2$ to one terminal of the motor $fb$.

With the cam switch 1 closed and with the meter pointer $G'$ in engagement with the high contact $g^3$, the motor $fa$ is operated to adjust the switch $F'$ to the right and thereby shorten the reversal periods terminated by the closure of the switch $F'$. For such operation of the motor $fa$, the motor energizing circuit completed includes the conductor 34 connected through switch 1 to supply conductor 14, a conductor 39 connecting a third terminal of the motor $fa$ to the contact $g^3$, the meter pointer $G'$, and the conductor 35 connecting $G'$ to the supply conductor 15. Similarly with the switch 1 closed and the meter pointer $G'$ in engagement with the high contact $g^4$, the motor $fb$ is set into operation to shorten the reversal periods terminated by the closure of switch $F^2$ by the completion of a circuit comprising the supply conductor 15, the conductor 35, meter pointer $G'$, contact $g^4$, a conductor 40, a third terminal of the motor $fb$, and the conductor 34 connecting a terminal of the motor $fb$ to the supply conductor 14 through the switch 1.

The extent of the adjustment effected on any one energization of either motor $fa$ or $fb$ depends upon the length of time during which the motor is operated. In the preferred mode of operation contemplated, each period of operation corresponds to a fraction only of the time required for the cam shaft $e'$ to complete a half turn, and is determined by the contour of the cam of cam switch 1, which, as shown in Fig. 3, is adapted to close the contacts of the switch during a short initial portion of each half turn of the shaft $e'$.

As has been previously stated, the contacts $g^5$ and $g^6$ of the meter G are emergency contacts provided to enable the meter G to actuate the switch mechanism E and effect a reversal independently of the timing mechanism F, whenever an excessive temperature differential causes the meter pointer G' to engage either contact $g^5$ or $g^6$. To this end, with the arrangement shown in Fig. 2, the contact $g^5$ is connected to the conductor 23, and, it and the meter pointer G' serve in effect as a switch connected in parallel with the switch F' between the supply conductor 15 and the conductor 23. In consequence, the engagement of the pointer G' and contact $g^5$ energizes the motor $e$ and effects an emergency reversal. Similarly, the meter pointer G' and the emergency contact $g^6$ serve as a switch connected in parallel with the switch F² between the supply conductor 15 and conductor 28, the latter being connected to the contact $g^6$. The emergency reversal operation effected when the pointer G' engages either contact $g^5$ or contact $g^6$ does not differ in respect to the energization or operation of the motor $e$ from the previously described normal reversal operation occurring on the closure of the switch F² or switch F'.

As shown in Fig. 2 the emergency reversals effected by the meter H when an individual temperature regenerator becomes unduly high or unduly low, like that effected through emergency contacts $g^4$ and $g^6$ of meter G, result from the energization of the motor $e$ while both switches F' and F² are open. The control circuits through which the meter H effects the emergency energization of the motor $e$ permits such energization only in response to a low temperature of the off regenerator and a high temperature of the on regenerator. This results from the previously described connections of the conductors 41 and 42 to the various contacts of the switch H³ and to the movable contacts of cam switches 2 and 3, one of which is left closed and the other left open at the end of each reversing half turn of the cam shaft $e'$. Thus with the condition of the apparatus illustrated in Figs. 1 and 2, in which the regenerator B' is the on regenerator and the regenerator B² is the off regenerator, the engagement of the meter pointer H' with the low contact $h'$ will not effect reversal if at the time of such engagement the meter H is connected to the thermocouple $tB'$ by the switch H², because at that time the switch H³ connects the contact $h'$ to the conductor 42 running to the movable contact of the then open cam switch 2, and for the same reason the engagement of the pointer H' and high contact $h^2$ will not then energize the motor $e$ because the position of the switch H³ will then connect the contact $h^2$ to the conductor 42 running to the open switch 2.

With the condition of the apparatus shown, however, if the pointer H' engages the low contact $h'$ while the switch H² permits the temperature of the off regenerator B² to be measured, the switch H³ will then connect the contact $h'$ to the conductor 41 which runs to the movable contact of the then closed switch 3. As shown the stationary contact of switch 3 is connected to the conductor 28 and the latter is then connected, as has been previously pointed out, through the then closed switch 4 to the terminal conductor 25 of the motor, so that that motor terminal is then connected to the supply conductor 15 since the meter pointer H' in engagement with the contact $h'$ is connected to branch conductor 17. This energizes the motor $e$ and effects reversal since the second terminal of motor $e$ is permanently connected to supply conductor 14 through branch conductor 26. Similarly when, in the condition of the apparatus shown in the drawings, meter pointer H' engages the high contact $h^2$ while the meter H is measuring the temperature in the on regenerator B', the motor $e$ will be energized by a circuit comprising the supply conductor 15, branch 17, meter pointer H', contact $h^2$, the switch H³ which then connects contact H² to conductor 41, closed switch 3, conductor 28, closed switch 4, conductor 25 and conductor 26 to the second supply conductor 14.

When the direction of furnace operation is reversed so that the regenerator B' becomes the off regenerator and the regenerator B² the on regenerator, the switches 3 and 4 will be open but the switches 2 and 5 will be closed. Under those conditions the engagement of the meter H' with the low contact $h'$ while measuring the temperature in the off regenerator B', or with the contact H² while measuring the temperature in the then on regenerator B², will connect supply conductor 15 through branch conductor 17, meter pointer H' and contact $h'$ or $h^2$; switch H³, conductor 42, switch 2, conductor 23 and cam switch 5 to the terminal conductor 25 of the motor $e$ and thereby energize the latter.

For emergency reversals initiated either by the meter H, or through the contacts $g^5$ and $g^6$ of the meter G, as well as for normal reversals, it is essential that the conductor 25, connected to one terminal of the meter $e$, should be connected to the supply conductor 15 for a period long enough for the motor to give a complete half turn to the shaft $e'$. To insure this result without requiring overlapping of the switch closing portions of the cams of switches 2 and 3, or of the switches 4 and 5, I have provided the switch mechanism E with an additional cam switch 6, which is open when the shaft $e'$ occupies either of its stationary positions, but is closed throughout practically the entire time in which the shaft is making either half turn. The switch 6 has its movable contact connected to the conductor 17 and its stationary contact connected to the conductor 25, so that after a half turn of the shaft $e'$ has been initiated by the closure of one of the switches 2, 3, 4 or 5, the connection of one terminal of the motor $e$ to the supply conductor 15, is maintained by the switch 6 until the half turn of the shaft $e'$ is completed notwithstanding the opening of the said switch 2, 3, 4 or 5, respectively.

In the normal operation of the apparatus disclosed, the time elapsing between each adjustment of the damper B³ and valves C³ and D³ into and out of their respective positions required for operation with the direction of flow through the regenerators and furnace illustrated in Fig. 1, is that required for the movement of the switch actuator $F^3$ from its righthand position in Fig. 2 to that in which it engages and closes the switch F'. Similarly each period of flow in the direction opposite to that shown in Fig. 1, corresponds to the time required for the movement of the switch actuator $F^4$ from its righthand position into the position in which it engages and closes the switch $F^2$. As the motor $f$ operates at constant speed and as the clutch member $F^{13}$ is shifted from engagement with one into engagement with the other of the clutch members $F^{14}$ and $F^{15}$ at each reversal operation, the time required for the travel of each of the switch actuators $F^3$ and $F^4$ between its righthand position and its switch closing position, is a function of the adjustment of the collar $F^{12}$ on the corresponding shaft $F^5$ or $F^6$ and the adjustment by the corresponding shaft $fa'$ or $fb'$ of the switch support $F^8$ which it supports.

The time and length of travel of each of the switch actuators $F^3$ and $F^2$ from its righthand to its switch closing position may be manually adjusted at any time, by adjustment of the corresponding collar $F^{12}$ along its supporting shaft $F^5$ or $F^6$ or by manual rotation of the corresponding shaft $fa'$ or $fb'$. Following any such adjustment, however, in normal operation the control meter G actuates the motors $fa$ and $fb$ as required to gradually restore the relative time periods of travel of the switch actuators $F^3$ and $F^4$ to the periods required for effecting reversals whenever the regenerator differential temperature in one direction is such as to bring the meter pointer G' to a position intermediate the contacts $g'$ and $g^3$, and the regenerator differential temperature in the opposite direction, is such as to bring the meter pointer G' into a position intermediate the contacts $g^2$ and $g^4$. The successive differential temperatures attained following successive reversals will tend to be the same or to be different depending on the adjustment of the means through which the temperature control is effected. With the contacts $g'$ and $g^3$ respectively closer to or farther away from the neutral position of the pointer G' than are the contacts $g^2$ and $g^4$, the differential temperature attained with flow in the direction indicated in Fig. 1 will be made smaller or greater, respectively, than the differential temperature attained with the flow in the reverse direction.

By the simple expedient of disconnecting the meter G from its controlling thermo-couple or by disconnecting the contacts $g'$—$g^4$ from the control circuits to which they are normally connected, the reversals in normal operation may be made wholly dependent upon the operation of the timing mechanism and will then depend upon the adjustments of the lengths of travel of the switch actuators $F^3$ and $F^4$ between their respective righthand and switch actuating positions. The length of travel of each switch actuator may then be made equal to or different from the length of travel of the other switch actuator. As those skilled in the art will understand, while under ideal conditions each interval of flow through the furnace in any direction, should ordinarily be equal to every other interval of flow in the same or in the opposite direction, ideal conditions do not always prevail. If, for example, as a result of accident or defect in furnace design one regenerator is found to be more efficient than the other, it is ordinarily desirable to make the intervals during which the more efficient regenerator is serving as an "on" regenerator, longer than the alternating intervals in which the other regenerator is serving as an "on" regenerator.

Whether the successive reversal intervals are equal or unequal it is in general desirable that those intervals should not be too short, because the reversal operation of itself tends to a disturbance in furnace operation and a lowering of furnace efficiency. On the other hand, unduly long periods between successive reversals are objectionable because an increase in those periods tends to a lower average preheat effect in the regenerators, and hence to a lower average furnace temperature. In practice therefore the determination of the average length of the periods between successive reversals ordinarily should represent a suitable compromise between a desire to avoid the disturbances due to reversals, and a desire to avoid unduly wide fluctuations in, and to maintain suitable average and maximum furnace temperatures. When conditions of operation make it desirable to increase or decrease the intervals between reversals which the control apparatus tends to maintain, such changes may be effected by adjusting the contacts $g'$ and $g^3$ and $g^2$ and $g^4$, respectively away from or toward the neutral or zero position of the pointer G', thereby increasing the controlling temperature differential.

It is not essential that the contacts $g'$, $g^3$ and $g^5$ should be disposed at one side of the natural zero position of the pointer G' symmetrically with respect to the disposition of the contacts $g^2$, $g^4$ and $g^6$, respectively at the opposite side of said position. The relative spacing of the contacts $g'$, $g^3$ and $g^5$ may be different from the relative spacing of the contacts $g^2$, $g^4$ and $g^6$, when conditions make such difference in spacing desirable. In general, for operation with prevailing temperatures in the regenerator B', for example, higher or lower than the temperatures in the regenerator $B^2$, the corresponding contacts $g^2$, $g^4$ and/or $g^6$ will be more remote or closer, respectively, to the normal zero position of the pointer G' than are the contacts $g'$, $g^3$ and/or $g^5$, respectively.

In general, it is undesirable to change the length of the reversal periods too abruptly. By making the extent of the adjustment effected by either motor $fa$ or $fb$ at any one operation suitably small, abruptness of change in the reversal period is avoided no matter how widely the meter contacts $g'$—$g^4$ may be adjusted. In such case if the meter contact adjustment made is relatively wide, the full resultant adjustment of the timing mechanism will not be completed until after more successive adjustments of the motors $fa$ and $fb$ are made than are required to give full effect to a smaller adjustment of the contacts $g'$—$g^4$. The extent of movement of the corresponding shaft $fa'$ or $fb'$, produced by any one operation of either motor $fa$ or $fb$, may well be subject to adjustment.

Such adjustment can be effected, for example, by varying the amount of the resistances $r'$ and $r^2$ in the common energizing leads of the two motors. By the adjustment of either resistances $r'$ or $r^2$ the extent of operation in either direction of the corresponding motor $fa$ or $fb$ can be varied. By the adjustment of the proper one of resistances $r^3$ in the various conductors 36, 37, 39 and 40, the extent of operation in one direction only of either motor *fa* or *fb* may be independently regulated.

When the meter G becomes accidently inoperative as a result of a burning out of a thermocouple TB' or TB², or of some other break in the circuit including those thermo-couples and the meter winding, the control apparatus as a whole is not rendered inoperative, but will continue to effect reversals at intervals determined by the existing adjustments of the supports F⁶ for the switches F' and F².

The nature and the practical importance of the provisions made for effecting emergency reversals independently of the timing mechanism and without regard to the condition of the latter, through the meter G on the attainment of excessive differential temperatures, and through the meter H on the attainment of excessive temperatures in the individual regenerators, will be apparent to those skilled in the art without further explanation. When the control meter G has its pointer G' periodically engaged by a depressor bar as is customary and as is done, for example, in the instrument shown in my above mentioned prior Patent 1,827,528, the meter is preferably provided with a dead (non-switch) central contact G⁷ to arrest and support the pointer when depressed while between live contacts *g'* and *g²*. The dead contact not only prevents undue bending of the meter pointer by the depressor, but also tends to prevent the meter pointer when between the contacts *g'* and *g²* from springing into engagement with either contacts *g'* or *g²* when the pointer is released by the depressor after being bent by the latter out of its normal position. The meter H is provided with a dead contact *h³* or pointer support between the live contacts *h'* and *h²* which serves the same purpose as the dead contact *g⁷* of the meter G.

The thermocouples TB', TB², *tB'* and *tB²* may be located to respond to temperature conditions in different portions of the regenerative system accordingly as conditions make desirable. For control in accordance with regenerator temperature differentials, there are certain advantages from the control standpoint in locating the thermocouples TB' and TB² in high temperature portions of the regenerators B' and B², respectively. In general, however, those thermo-couples will have longer lives and be less expensive to maintain if located at the inlet to the regenerators B' and B² or in other portions of the regenerators in which the temperatures to which the thermo-couples are subjected are lower than the maximum regenerator temperatures. Similarly the thermo-couples *tB'* and *tB²* may be located at points in the regenerative system at which maximum regenerator temperatures or temperatures lower than the maximum regenerator temperatures prevail. While the meter H has been described as exercising its control functions in response to maximum temperatures to which the thermo-couples *tB'* and *tB²* are subjected, it may be arranged to exercise its control functions in response to the attainment of excessively low temperatures in the portions of the regenerators in which the last mentioned thermo-couples are arranged.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention what I claim as new and desire to secure by Letters Patent, is:

1. In apparatus for controlling the reversal of a regenerative furnace, furnace reversing means, an adjustable timing mechanism controlling said reversing means and operative to effect reversals at time intervals dependent on the adjustment of said mechanism and means responsive to regenerative temperature conditions for adjusting said timing mechanism to thereby vary said intervals.

2. In apparatus for controlling the reversal of a regenerative furnace, furnace reversing means, an adjustable timing mechanism controlling said reversing means and operative to make the period between successive reversals dependent on the adjustment of said mechanism, and means responsive to furnace temperature condition varying in value progressively during each such period automatically effecting adjustments of said mechanism tending to make the length of each such period that required to give a standard value to said condition.

3. In apparatus for controlling the reversal of a regenerative furnace, furnace reversing means, an adjustable timing mechanism controlling said reversing mechanism and operative to effect reversals at time intervals dependent upon the adjustment of said mechanism, and means responsive to furnace temperature conditions for adjusting said mechanism when the temperature condition attained during furnace operation in either direction differs from a standard value for said condition with such direction of operation to thereby vary the length of subsequent periods of operation in the last mentioned direction.

4. In apparatus for controlling the reversal of a regenerative furnace, furnace reversing means, timing mechanism including two adjustable timing elements alternately actuating said means at intervals respectively dependent on the adjustment of said elements, and means for independently adjusting each element in accordance with the value of a regenerator temperature condition attained with the particular direction of operation reversed by the actuation of said element.

5. In apparatus for controlling the reversal of a regenerative furnace, furnace reversing means, timing mechanism including two adjustable timing elements alternately actuating said means at intervals respectively dependent on the adjustment of said elements, and means for independently adjusting each element in accordance with the value of a regenerator temperature condition attained with the particular direction of operation reversed by the actuation of said element and means whereby the attainment of an abnormal temperature condition actuates said reversing means to effect reversal independently of said timing mechanism.

6. In apparatus for controlling the reversal of a regenerative furnace, furnace reversing means and controlling means therefor comprising a timing mechanism effecting reversals at intervals dependent on the adjustment thereof and regenerative temperature responsive means adjusting said mechanism and tending to maintain the latter in such adjustment that reversals are effected approximately on the attainment of predetermined differences in on and off regenerator temperatures.

7. In apparatus for controlling the reversal of a regenerative furnace, furnace reversing means and controlling means therefor comprising a timing mechanism and regenerator temperature responsive means cooperating with said mechanism to effect reversals approximately on the attainment of a predetermined difference in on and off regenerator temperatures with furnace operation in one direction and on the attainment of a different temperature difference when furnace operation is in the other direction.

8. In apparatus for controlling the reversal of a regenerative furnace, furnace reversing means and controlling means therefor comprising a timing mechanism and regenerator temperature responsive means cooperating with said mechanism to effect reversals approximately on the attainment of a predetermined difference in on and off regenerator temperatures, and adjusting means for varying said predetermined differences.

9. In apparatus for controlling the reversal of a regenerative furnace, furnace reversing means and controlling means therefor comprising a timing mechanism and regenerator temperature responsive means cooperating with said mechanism to effect reversals approximately on the attainment of a predetermined difference in on and off regenerator temperatures, and adjusting means for varying the said difference with furnace operation in one direction relative to the predetermined difference with furnace operation in the opposite direction.

10. In apparatus for reversing a regenerative furnace, furnace reversing means, an adjustable timing mechanism shifted alternately into one and the other of two operative conditions by successive operations of said means and adapted when in either condition to operate said reversing means after a definite time interval, means responsive to the differential of on and off regenerator temperatures for adjusting said mechanism to vary its time of operation in either condition required to effect reversal, means controlled by the last mentioned means for operating said reversing means independently of said mechanism when said differential attains abnormal values, means for measuring individual regenerator temperatures, and means actuated thereby for operating said reversing means when the temperature in the on regenerator becomes abnormally high or the temperature in the off regenerator becomes abnormally low.

11. In apparatus for controlling the reversal of a regenerative furnace, furnace reversing means, an adjustable timing mechanism normally controlling the operation of said means, means responsive to a regenerator temperature condition for adjusting said mechanism in accordance with said condition, and means responsive to another regenerator temperature condition for setting said reversing means into operation independently of said timing mechanism on the attainment by the last mentioned condition of an abnormal value.

12. In apparatus for controlling the reversal of a regenerative furnace, furnace reversing means and controlling means therefor comprising an intermittently operated switch mechanism, an adjustable timing mechanism, means responsive to a regenerator temperature condition for adjusting said timing mechanism on a variation in the value of said condition from a standard value thereof, and means actuated by the last mentioned means for operating said switch mechanism independently of said timing mechanism when said condition has an abnormal value.

13. In apparatus for controlling the reversal of a regenerative furnace, furnace reversing means, a timing mechanism comprising a constantly operating driving element and two driven elements, means for connecting one of said driven elements to, and disconnecting the other from the driving element at each operation of the reversing means, adjustable means through which each driven element acts after an extent of operation dependent on the adjustment of the last mentioned means to operate said reversing means, and means responsive to a furnace temperature condition for adjusting said adjustable means.

14. In apparatus for controlling the reversal of a regenerative furnace, furnace reversing means, mechanism for setting said means into operation, and controlling means for said mechanism responsive to the differential between on and off regenerator temperatures attained during each period of furnace operation in one direction for effecting adjustments of said mechanism tending to make the following period of operation in the same direction that required for said differential to attain a predetermined value during such period.

15. In apparatus for controlling the reversal of a regenerative furnace, furnace reversing means, an adjustable timing mechanism controlling said reversing means and operative to effect reversals dependent on the adjustment of said mechanism, means responsive to a regenerative temperature condition, and means actuated by the last mentioned means for adjusting said mechanism to thereby vary the time of reversal with normal values of said condition and for operating said reversing means independently of said timing mechanism on the attainment of abnormal values of said condition.

16. In apparatus for controlling the reversal of a regenerative furnace, furnace reversing means, an adjustable timing mechanism for operating said reversing means at intervals dependent upon the adjustment of said mechanism, means responsive to the differential of on and off regenerator temperatures for adjusting said mechanism in accordance with the value of said differential, means actuated by the attainment of an abnormal value of said differential for operating said reversing means independently of said timing mechanism, and means responsive to an individual regenerator temperature for operating said reversing means independently of said timing mechanism.

17. In apparatus for controlling the reversal of a regenerative furnace, furnace reversing means, an adjustable timing mechanism shifted from one into the other of two operative conditions on each operation of said reversing means and adapted when in either condition to operate said reversing means after a time interval, and means responsive to the differential of on and off regenerative temperatures attained during each direction of furnace operation for adjusting said mechanism to make the said interval for following operation in the same direction, that required for the attainment by said differential of a standard value.

18. In apparatus for controlling the reversal of a regenerative furnace, furnace reversing means, an adjustable timing mechanism shifted from one into the other of two operative conditions on each operation of said reversing means and adapted when in either condition to operate said reversing means after a time interval, means responsive to the differential of on and off regenerative temperatures attained during each direction of furnace operation for adjusting said mechanism to make the said interval for the following operation in the same direction that required for the attainment by said differential of a standard value, and means responsive to an abnormal regenerator temperature condition for operating said reversing means independently of said timing mechanism.

19. In apparatus for controlling the reversal of a regenerative furnace, furnace reversing means, a timing mechanism controlling the operation of said means and comprising a constantly operating driving member, two timing elements, means actuated by said reversing means for operatively connecting one or the other of said timing elements to said driving member accordingly as the furnace operation is in one direction or the other, each timing element being operated when so connected to the driving member to set said means into operation and thereby terminate its connection with said member, and means responsive to a furnace temperature condition through which the extent of operation of each timing element required to set said reversing means into operation is varied in accordance with said temperature condition.

20. In apparatus for controlling the reversal of a regenerative furnace, furnace reversing means, a timing mechanism normally controlling the operation of said reversing means and comprising a constantly running shaft, two timing shafts, means actuated by said reversing means for driving one or the other of said timing shafts from said driving shaft accordingly as the furnace operation is in one direction or the other, means actuated after a predetermined extent of movement of each timing shaft for setting said reversing means into operation, and means automatically responsive to a furnace temperature condition for automatically adjusting the extent of movement of each timing shaft required for starting said reversing means into operation.

21. In apparatus for controlling the reversal of a regenerative furnace, intermittently operating reversing means for reversing said furnace whenever said means are set into operation, a timing mechanism comprising a constantly operating driving element and two timing elements alternately connected to and driven by said driving element as said reversing means is successively operated, means through which a predetermined extent of movement of each driving element normally sets the reversing means into operation, and means responsive to a furnace temperature condition created by the corresponding direction of furnace operation for varying the extent of movement of each timing element required to set the reversing means into operation.

22. In controlling apparatus, a continuously rotating drive member, a pair of threaded shafts, a device carried by each of the last mentioned shafts and moved along the latter by its rotation in one direction or the other according to the direction of rotation, two elements one associated with each of said device and operatively engaged thereby as a result of the movement of the device in one direction along its supporting shaft, controlled mechanism set into operation by the engagement of each device with the corresponding element, means actuated by said mechanism when set into operation for disconnecting the shaft carrying the device by which the mechanism was set into operation from the drive member and for connecting the other threaded shaft to the drive member, means for reversely rotating each threaded shaft when disconnected from the drive shaft to return the corresponding device to an initial position and means dependent on effects produced by said mechanism for adjusting said elements and thereby varying the extents of movements of the corresponding devices away from their respective initial position required to start said mechanism into operation.

23. In apparatus for controlling the reversal of a regenerative furnace, furnace reversing means comprising an adjustable timing mechanism operative to effect reversals at time intervals dependent on the adjustment of said mechanism and including means for the adjustment of said mechanism to thereby vary the intervals between successive following reversals, and means responsive to regenerator temperature conditions for adjusting said timing mechanism automatically in accordance with said conditions in relatively small increments whereby wide adjustments of said mechanism by the last mentioned means are effected in a plurality of steps distributed over a plurality of reversal operations.

24. In apparatus for controlling the reversal of a regenerative furnace, furnace reversing means comprising an adjustable timing mechanism operative to effect reversals at time intervals dependent on the adjustment of said mechanism, and means responsive to a regenerator temperature condition for adjusting said timing mechanism automatically in accordance with said conditions in a relatively small increment at each reversal whereby on a relatively abrupt variation in the response of the last mentioned means to said condition the last mentioned means varies the time between reversals in a plurality of steps, one for each of a corresponding plurality of reversal operations.

ANKER EILER KROGH.